United States Patent
Oi et al.

(10) Patent No.: US 8,711,389 B2
(45) Date of Patent: *Apr. 29, 2014

(54) PRINTING CONTROL METHOD AND PRINTER FOR PRINTING ON A LABEL

(71) Applicant: Seiko Epson Corporation, Tokyo (JP)

(72) Inventors: Tomoyuki Oi, Matsumoto (JP); Junichi Arai, Chiryu (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/777,167

(22) Filed: Feb. 26, 2013

(65) Prior Publication Data

US 2013/0176588 A1 Jul. 11, 2013

Related U.S. Application Data

(63) Continuation of application No. 12/535,641, filed on Aug. 4, 2009, now Pat. No. 8,405,843.

(30) Foreign Application Priority Data

Aug. 5, 2008 (JP) ................................. 2008-201565

(51) Int. Cl.
*G06F 15/00* (2006.01)
*G06K 1/00* (2006.01)
*G06K 15/00* (2006.01)
*G06F 3/12* (2006.01)
*G06K 15/02* (2006.01)

(52) U.S. Cl.
CPC .............. *G06F 3/1234* (2013.01); *G06K 15/00* (2013.01); *G06K 15/02* (2013.01)
USPC ........................................ 358/1.14; 358/1.13

(58) Field of Classification Search
CPC ....... G06F 3/1234; G06K 15/00; G06K 15/02
USPC ................................ 358/1.13, 1.14, 1.1, 1.15
See application file for complete search history.

(56) References Cited

U.S. PATENT DOCUMENTS 6,473,192 B1 10/2002 Kidani et al.
6,985,257 B2 1/2006 Kidani et al.
(Continued)

FOREIGN PATENT DOCUMENTS

JP 09-076606 A 3/1997
JP 11-095957 A 4/1999
(Continued)

*Primary Examiner* — Douglas Tran
(74) *Attorney, Agent, or Firm* — Kilpatrick Townsend & Stockton LLP

(57) ABSTRACT

A printer and reprinting control method do not reprint when an error accompanied by no damage to the actual printing area or print image on paper occurs so that consumables are not wasted. The printer reprints the label on which the print image was being formed when a specific error occurs if the error occurred while the inkjet head was forming the print image in the actual printing area of the label. When the non-printing area of the label is passing the printing position of the inkjet head, the print image in the actual printing area that was printed immediately before an error occurs is reprinted only if a specific error is detected, such as a paper jam error or mechanical error with the possibility of damage to the paper or label.

14 Claims, 5 Drawing Sheets

(56) References Cited

U.S. PATENT DOCUMENTS

| | | |
|---|---|---|
| 7,355,731 B2 | 4/2008 | Kidani et al. |
| 2005/0088681 A1 | 4/2005 | Hosoda |
| 2007/0036598 A1 | 2/2007 | Toda |
| 2007/0103714 A1 | 5/2007 | Ushiku |
| 2008/0055626 A1 | 3/2008 | Root et al. |
| 2008/0126793 A1* | 5/2008 | Jostmeyer et al. ............ 713/100 |
| 2008/0313205 A1 | 12/2008 | Elgar et al. |

FOREIGN PATENT DOCUMENTS

| | | |
|---|---|---|
| JP | 2002-036640 A | 2/2002 |
| JP | 2002-248840 A | 9/2002 |
| JP | 2007-050546 A | 3/2007 |

* cited by examiner

PRINTING CONTROL METHOD AND PRINTER FOR PRINTING ON A LABEL

This application is a continuation of U.S. patent application Ser. No. 12/535,641, filed on Aug. 4, 2009, which claims priority under 35 U.S.C. §119 to Japanese Patent Application No. 2008-201565 filed on Aug. 5, 2008, the entireties of which are expressly incorporated by reference herein.

BACKGROUND

1. Technical Field

The present invention relates to a printer and to a printing control method that includes determining if reprinting is necessary when an error occurs during a printing process.

2. Related Art

Printers that print to a continuous print medium such as label paper or roll paper having a continuous web of paper wound into a roll, and reprint the same content when, for example, an error occurs during printing and normal printing is temporarily disabled are known from the literature. Japanese Unexamined Patent Appl. Pub. JP-A-2002-36640, for example, teaches a label printer for printing a set of plural labels that, when a paper jam or other error occurs while printing, reprints the entire label set (a plurality of labels printed continuously in a single print job) containing the label that was being printed when the error occurred instead of reprinting only the one label.

Even if an error occurs during printing, however, the labels that were already printed can be used and do not need to be reprinted if there is no damage (that is, the label was printed normally) in the actual printing area (the area in which content is actually printed) of the paper. However, when the error detection means of the label printer taught in JP-A-2002-36640 determines that an error occurred while printing a label set, the printer always reprints the entire label set when operation resumes after the error is corrected. This means that all labels will be reprinted even if there is no damage to the actual printing area of the labels and reprinting is not necessary, the printer thus prints needlessly, and consumables such as paper and ink are wasted.

In order to reprint only when reprinting is actually necessary, it is conceivable to reprint only when damage to the actual printing area of the paper or the content printed therein is detected by an image sensor. However, this method requires adding a costly image sensor to the printer. Another problem with this method is that because the image sensor must be located downstream from the printing position, the size of the printer is necessarily increased. Executing the detection process to confirm if there is damage to the actual printing area of the paper or the content printed therein while printing also reduces the processing speed and printer throughput.

SUMMARY

A printer and a reprinting control method for a printer according to at least one embodiment of the present invention enable, without using an expensive image sensor, not reprinting when an error occurs if the error does not indicate damage to the content printed in the actual printing area of the paper.

A first aspect of the invention is a reprinting control method for a printer including steps of: detecting if an error belonging to either at least a first error group or second error group occurs while processing print data; determining if the detected error is a first error belonging to the first error group or a second error belonging to the second error group if occurrence of said error is detected; and determining whether or not to reprint the print data to paper based on the content of the print data being processed and the result of said error determination when an error is detected to have occurred.

Another aspect of the invention is a printer having a transportation unit that conveys paper; a print head that prints to the paper; a first error detection unit that detects a first error belonging to a first error group; a second error detection unit that detects a second error belonging to a second error group; and a control unit that processes print data, determines if the first error detection unit or second error detection unit detected an error, and determines whether or not to reprint the print data based on the content of the print data being processed and the result of said error determination when an error is detected to have occurred.

A preferred aspect of the invention thus determines whether or not printing is required based on the type of error and the content of the print data being processed when the error occurred. The need for reprinting can therefore be determined more accurately because the need for reprinting is determined by detecting if an error with an extremely high probability of damage to the printout occurred while printing in the printing area. Reprinting when there is no damage to the printout and reprinting is not necessary can thus be suppressed, and a drop in the throughput of a continuous print job and waste of consumables such as paper and ink resulting from unnecessary printing can be reduced.

In addition, because whether reprinting is necessary is determined based on the type and presence of an error, it is not necessary to use a high cost sensor to check whether the paper has actually been damaged or the printed content has been damaged. The printer cost can therefore be reduced and the configuration can be simplified.

A reprinting control method according to another aspect of the invention also has steps of detecting while processing a margin area if the first error or second error occurred when the print data includes a printing area and a margin area, reprinting if the second error was detected, and not reprinting if the first error was detected.

When the print data includes a printing area and a margin area, the control unit of a printer according to another aspect of the invention reprints if the second error detection unit detected a second error, and does not reprint if the first error detection unit detected a first error, while processing a margin area.

The likelihood of there being no damaged to the printed part is high during operations such as conveying the margin area where the print head does not print. The need for reprinting can therefore be determined more appropriately in such cases if reprinting occurs only when an error of a specific type with a possibility of damaging the printout (a second error included in the second error group) is detected. Reprinting even when reprinting is not necessary can therefore be suppressed.

A reprinting control method according to another aspect of the invention also has steps of detecting while processing the margin area of a particular page if the first error or second error occurred when the print data includes a printing area and a margin area and is divided into page units, reprinting to the next page after the particular page on the paper if the second error was detected, and not reprinting if the first error was detected.

When the print data includes a printing area and a margin area and is divided into page units, the control unit of a printer according to another aspect of the invention reprints to the next page after a particular page on the paper if while processing the margin area of the particular page the second error detection unit detected the second error, and does not reprint if the first error detection unit detected the first error.

Further preferably in this configuration, the reprinting control method also has steps of detecting while processing the printing area if the first error or second error occurred, and reprinting if the first error was detected or if the second error was detected.

Yet further preferably, the control unit reprints if the first error detection unit detects the first error or the second error detection unit detects the second error while processing the printing area.

Yet further preferably, the reprinting control method for a printer according to another aspect of the invention also has steps of detecting while processing the printing area of a particular page if the first error or second error occurred when the print data includes a printing area and a margin area and is divided into page units, and reprinting to the next page after the particular page on the paper if the second error was detected.

Yet further preferably, when the print data includes a printing area and a margin area and is divided into page units, the control unit of a printer according to another aspect of the invention reprints to the next page after a particular page on the paper if the first error detection unit detects the first error or the second error detection unit detects the second error while processing the printing area of a particular page.

As described above, one aspect of the invention uses different standards to determine if reprinting is necessary, detecting the occurrence of errors while printing to the printing area and the occurrence of errors while conveying the recording medium through the margin area when the print data is compiled in page units containing a printing area and a margin area. Therefore, because reprinting occurs only when there is a strong possibility of damage to the print content in the actual printing area, unnecessary printing and unnecessary consumption of consumables such as paper and ink can be reduced.

In addition, it is not necessary to use a high cost group of sensors to check whether the paper has actually been damaged or the content printed on paper has been damaged, the printer cost can therefore be reduced and the printer configuration can be simplified. Furthermore, because pages on which the printed content was likely damaged can be reprinted by page unit, it is possible to print only the required number of normally printed pages.

The second error group preferably includes at least a paper jam error or a mechanical error. The first error group preferably includes at least a cover open error for the access cover that opens and closes the paper compartment, or a no-paper error.

Further preferably, the second error detection unit detects at least if an error related to a paper jam or an error related to a mechanism of the printer occurs. The first error detection unit preferably detects at least an error indicating a cover is open or an error indicating that there is no paper.

Because paper jam errors and mechanical errors typically include the possibility of damage to the paper, there is also the possibility of damage to the content that was just printed even if the error occurred while conveying the paper through the margin area. In addition, cover open errors and no-paper errors occur without damage to the paper or with an extremely low possibility of damage to the printed content if printing in the printing area has already ended. Therefore, by using different standards to determine if reprinting is necessary according to the type of error, it is possible to reprint only when the possibility of damage to the actual printed content is high.

A printer according to another aspect of the invention determines whether or not reprinting the printed area is necessary by means of the reprinting control method for a printer according to the invention.

Effect of at Least One Embodiment of the Invention

A preferred aspect of the invention differentiates between errors with a high possibility of damage to the paper and errors with a low possibility of damage to the paper, determines whether or not reprinting is necessary based on whether the error occurred while printing to the printing area where the possibility of damage to the printed content is extremely high, or whether the error occurred while, for example, conveying the paper through the margin area where content is not printed, and can therefore more accurately determine the need for reprinting. Reprinting even when there is no damage to the printed content and reprinting is not necessary can therefore be suppressed, and unnecessary reprinting and waste of consumables such as paper and ink can be reduced.

Furthermore, because the need for reprinting is determined according to the type and occurrence of an error, it is not necessary to use a high cost sensor group to confirm if there was actually any damage to the paper or damage to the content printed on the paper. The printer cost can therefore be reduced and the configuration simplified.

Other objects and attainments together with a fuller understanding of the invention will become apparent and appreciated by referring to the following description and claims taken in conjunction with the accompanying drawings.

DESCRIPTION OF EXEMPLARY EMBODIMENTS

A printer according to a preferred embodiment of the present invention is described below with reference to the accompanying figures.

General Configuration

Figure 1:
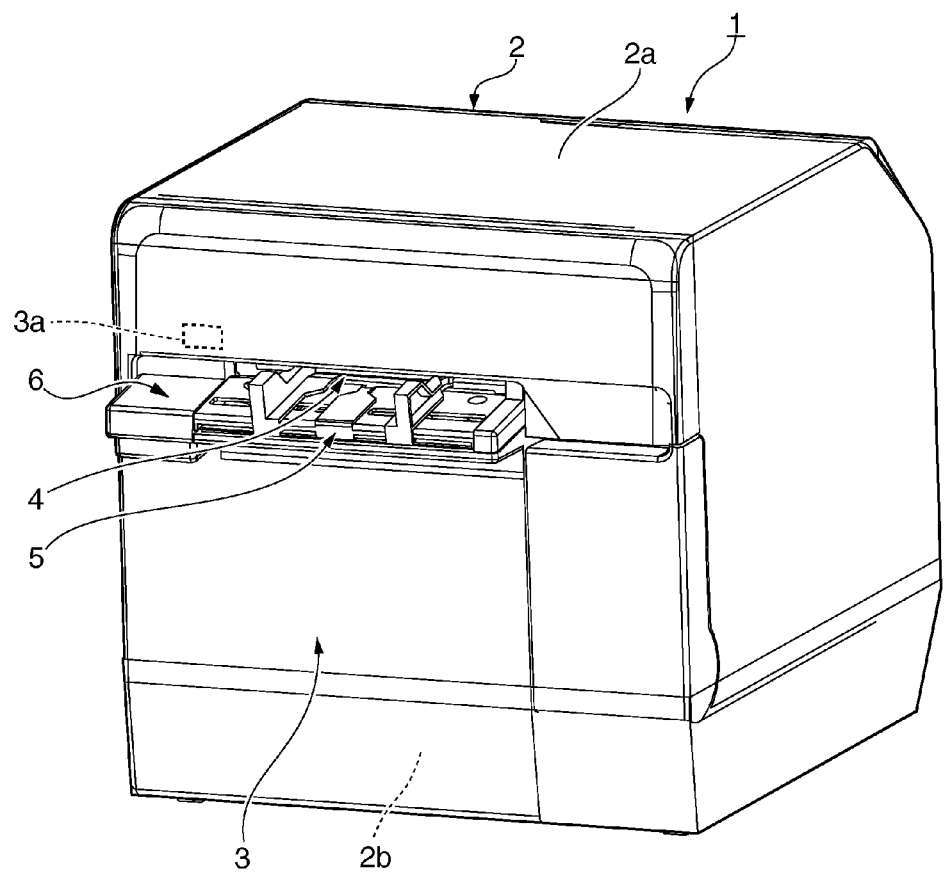
FIG. 1 is an external oblique view of a printer according to a preferred embodiment of the invention.
Figure 2:
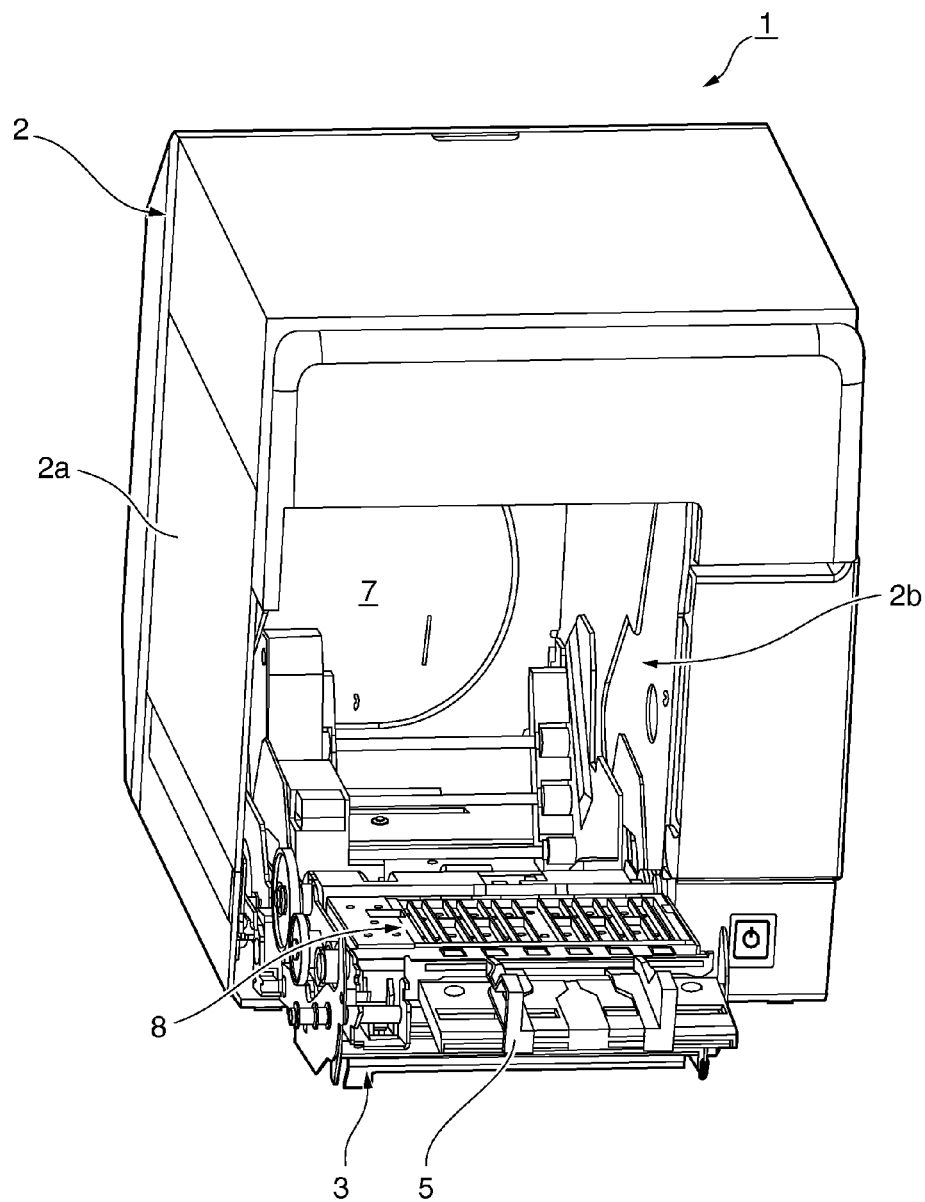
FIG. 2 is an external oblique view of the label printer with the access cover open.

FIG. 1 is an oblique view showing an inkjet printer according to a first embodiment of the invention. FIG. 2 is an oblique view of the printer with the cover completely open.

The printer 1 has a rectangular box-like body 2 and a cover 3 that opens and closes and is disposed to the front of the body 2. A paper exit 4 of a specific width is formed at the front of the outside case 2a part of the printer body 2. An exit guide 5 projects to the front from the bottom of the paper exit 4, and a cover opening lever 6 is disposed beside the exit guide 5. A rectangular opening 2b for loading and removing roll paper is formed in the outside case 2a below the exit guide 5 and cover opening lever 6, and this opening 2b is closed by the cover 3.

Operating the cover opening lever 6 unlocks the cover 3. When the exit guide 5 disposed to the cover 3 is pulled forward after the lock is released, the cover 3 pivots at the bottom end part thereof and opens forward to a substantially horizontal position as shown in FIG. 2. When the cover 3 opens, the roll paper compartment 7 formed inside the printer case 2 opens. The platen 8 that determines the printing position moves with the cover 3 at the same time, and the transportation path from the roll paper compartment 7 to the paper exit 4 opens so that the roll paper can be easily loaded and replaced from the front of the printer. Note that the cover case of the cover 3 and the cover opening lever 6 are not shown in FIG. 2.

An open/close detector 3a is disposed near the cover 3. The open/close detector 3a may be a photosensor, a magnetic sensor, a microswitch, or other device. The open/close detector 3a detects when the cover 3 changes from an open to a closed position, or from the closed to the open position.

Internal Configuration

Figure 3:
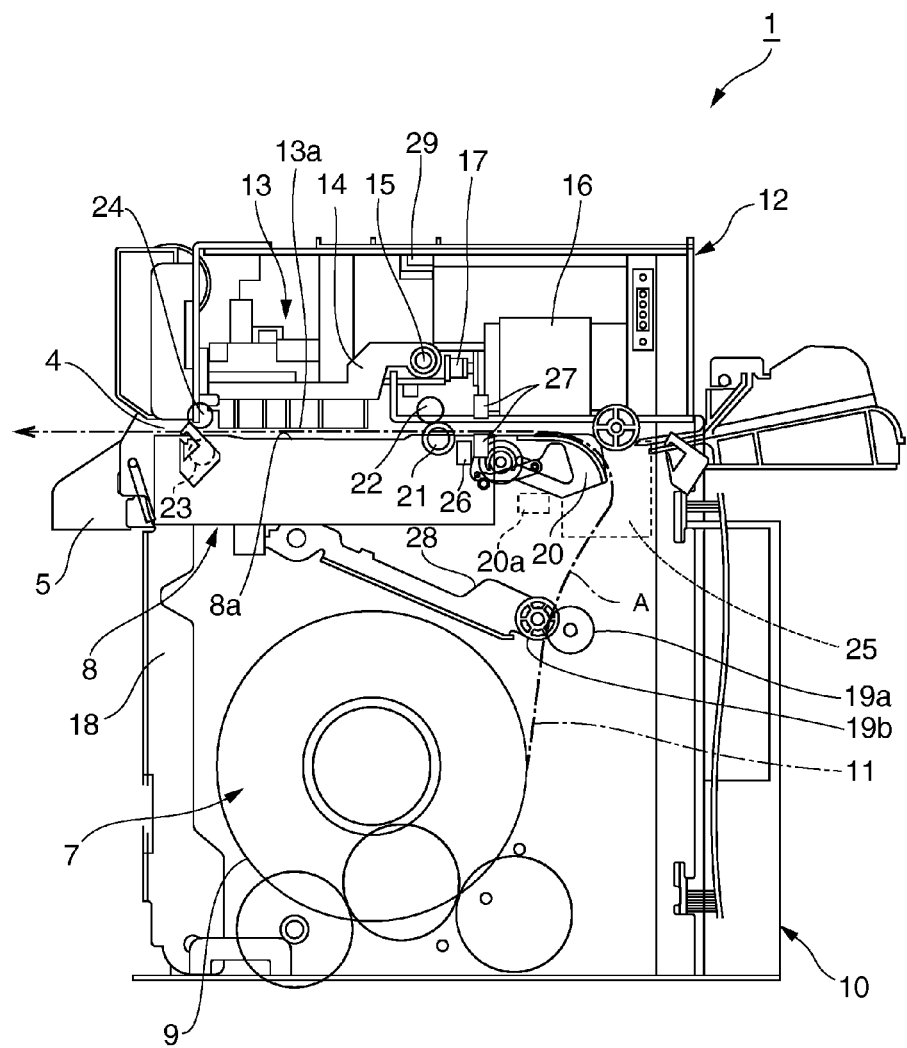
FIG. 3 is a vertical section view showing the internal structure of the label printer.

FIG. 3 shows the internal configuration of the printer 1. A roll paper compartment 7 is formed in the center between the side walls of the printer frame 10 inside the printer 1. Roll paper 9 is loaded inside the roll paper compartment 7 with the core of the roll paper 9 placed widthwise to the printer so that the roll paper can roll on its side.

A head unit frame 12 is disposed horizontally at the top of the printer frame 10 above the roll paper compartment 7. Disposed to the head unit frame 12 are an inkjet head 13, a carriage 14 that carries the inkjet head 13, and a carriage guide shaft 15 that guides movement of the carriage 14 widthwise to the printer. The inkjet head 13 is mounted on the carriage 14 with the ink nozzle surface 13a facing down. The carriage guide shaft 15 is disposed horizontally widthwise to the printer. A carriage transportation mechanism including a carriage motor 16 and timing belt 17 for moving the carriage 14 bidirectionally along the carriage guide shaft 15 is disposed to the head unit frame 12.

A platen frame 18 extending horizontally between the front and back of the printer is disposed below the inkjet head 13. The platen 8 extending horizontally widthwise to the printer is disposed at the top of the platen frame 18. The platen 8 is disposed with a constant gap to the inkjet head 13 and defines the printing position of the inkjet head 13. The platen 8 is a vacuum platen that can pull the paper 11 to its surface 8a19 determines the printing position of the inkjet head 13.

A rear paper feed roller 21 is disposed horizontally widthwise to the printer behind the platen 8. A rear paper pressure roller 22 of a specific width is pressed with a predetermined force against the rear paper feed roller 21 with the paper 11 therebetween.

A front paper feed roller 23 is disposed on the front side of the platen 8. A front paper pressure roller 24 is pressed from above to the front paper feed roller 23 with the paper 11 therebetween.

The rear paper feed roller 21 is rotationally driven by the paper transportation motor 25 disposed to the back of the platen frame 18.

A delivery roller 19a and a pressure roller 19b are disposed to a position at the top rear part of the roll paper compartment 7. The pressure roller 19b is attached to the distal end of a lever 28 attached to the platen frame 18, and the pressure roller 19b is attached to the printer frame 10 side. The delivery roller 19a is driven rotationally by the paper transportation motor 25 synchronously to the rear paper feed roller 21.

The paper 11 pulled from the roll paper 9 in the roll paper compartment 7 travels passed the delivery roller 19a and a pressure roller 19b to a tension guide 20 disposed at the back end of the platen frame 18. The tension guide 20 curves downward, and is urged upward by a spring force. The paper 11 is pulled out so that it curves forward over the curved surface of the tension guide 20, is then pulled horizontally over the surface 8a of the platen 8, and is set so that it passes the printing position of the inkjet head 13 and travels out from the paper exit 4. The paper 11 loaded from the roll paper compartment 7 passed the tension guide 20 and platen 8 and out from the paper exit 4 is conveyed with a specific tension applied thereto by the tension guide 20.

A position detector 20a for detecting the position of the tension guide 20 is disposed near the tension guide 20. This position detector 20a may be a photosensor, magnetic sensor, or microswitch, for example. When the paper 11 loaded in the transportation path A becomes slack due to a paper jam, for example, the tension guide 20 moves up from its normal position applying the specific tension to the paper 11. If the paper 11 cannot travel through the transportation path A and higher than normal tension is applied, the tension guide 20 descends from its normal position. Whether or not the tension guide 20 is applying the specific tension to the paper 11 can therefore be detected from the output of the position detector 20a, and paper jam errors in the printer 1 can therefore be detected.

Occurrence of a paper jam in the printer 1 may also be detected by detecting abnormal conveyance of the paper 11 by detecting the load on the paper transportation motor 25 that drives the delivery roller 19a and rear paper feed roller 21.

The occurrence of a paper jam may also be detected by using a home position sensor, which is a photosensor for detecting the position of the carriage 14, to detect if carriage movement has stopped due to a paper jam. Further alternatively, occurrence of a paper jam may be detected by disposing an encoder to the carriage motor 16, paper transportation motor 25, or a roller that rotates in conjunction therewith, and detecting if the motor or roller has stopped or is rotating at an abnormally low speed.

A reflection photosensor 26 and a transmission photosensor 27 for detecting if paper 11 is present are disposed to the transportation path A upstream from the rear paper feed roller 21. The reflection photosensor 26 can detect a positioning reference such as black index marks on the paper 11 using variation in the reflectivity of an emitted detection beam. Using variation in the transmittance of an emitted detection beam, the transmission photosensor 27 can detect the leading end or trailing end of the paper 11, or the leading end or trailing end of a label when label paper having labels removably attached to a liner is used as the paper 11.

An encoder sensor 29 mounted on the carriage 14 is disposed above the transportation path A. The encoder sensor 29 functions as a linear encoder in conjunction with a linear scale that extends through the range of bidirectional movement of the carriage 14, and functions as a position detector for detecting the positions of the carriage 14 and the inkjet head 13 widthwise to the printer. Note that instead of directly detecting the amount of carriage 14 and inkjet head 13 movement using the encoder sensor 29 and linear scale, the movement of the carriage 14 and inkjet head 13 widthwise to the printer may be calculated based on the detected rotation of the carriage motor 16 to determine the positions of the carriage 14 and inkjet head 13 widthwise to the printer. Note that a paper jam error may also be detected using the linear encoder.

The paper 11 delivered from the roll paper 9 is conveyed by the drive power of the paper transportation motor 25 while held to the surface 8a of the platen 8, and passes the printing position of the inkjet head 13. The inkjet head 13 disposed to the carriage 14 prints while the carriage 14 is moved bidirectionally along the carriage guide shaft 15. When printing one line across the width of the paper 11 ends, the rear paper feed roller 21 and front paper feed roller 23 are rotationally driven and the paper 11 is advanced a predetermined pitch. The next line is then printed. Content is thus printed to the paper 11 by the inkjet head 13 while the paper 11 is intermittently conveyed a predetermined pitch. A scissor-type paper cutter, for example, not shown in the figures is also disposed to the paper exit 4 which from the printed paper 11 is discharged, and the paper 11 is cut across the width by this paper cutter mechanism. A sensor that detects the position of the movable knife of the paper cutter mechanism may also detect if the movable knife has stopped and if a paper jam error has occurred may be determined.

Control System

Figure 4:
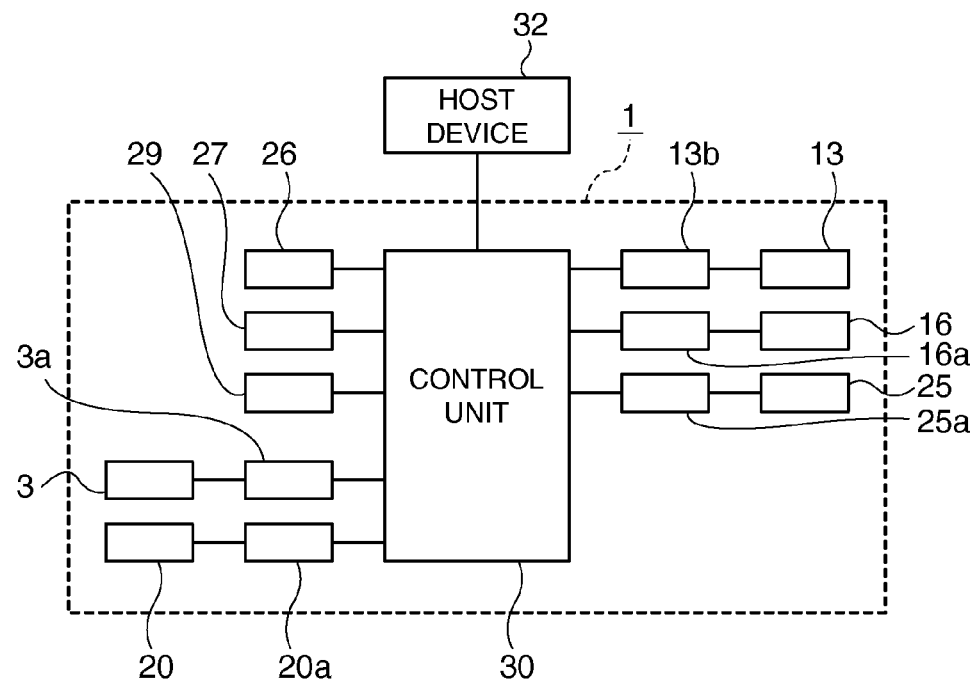
FIG. 4 is a schematic block diagram showing the control system of the label printer.

FIG. 4 is a schematic block diagram showing the control system of the printer 1. The control system of the printer 1 is constructed around a control unit 30 including a CPU, ROM, and RAM. Print data (including commands) is supplied from the host device 32 or other host terminal through a communication unit not shown to the control unit 30. Based on print data from the host device 32, the control unit 30 controls driving units including the inkjet head 13, the paper feed mechanism for conveying the paper 11 and the carriage transportation mechanism, the paper vacuum mechanism, for example, and thus executes the paper transportation operation and printing operation.

The inkjet head 13 is connected to the output side of the control unit 30 through the head driver 13b, and the control unit 30 controls driving the inkjet head 13 through the head driver 13b. The carriage motor 16 and paper transportation motor 25 are connected to the output side of the control unit 30 through a motor driver 16a and motor driver 25a, and the control unit 30 controls driving the paper transportation motor 25 and carriage motor 16 through the motor drivers 25a and 16a. The control unit 30 can calculate a specific transportation distance for the paper 11 by integrating the number of steps or the rotational distance that the paper transportation motor 25 is driven in the advancing direction.

The open/close detector 3a, position detector 20a, reflection photosensor 26, transmission photosensor 27, encoder sensor 29 and other detectors are also connected to the input side of the control unit 30. The control unit 30 determines that condition of various parts of the printer 1 and the condition of the paper 11 based on the output from these various detectors. More specifically, based on the output of the open/close detector 3a, the control unit 30 detects opening and closing of the cover 3. Based on output from the position detector 20a, the control unit 30 detects if a paper jam error has occurred. Based on the output from the reflection photosensor 26 and transmission photosensor 27, the control unit 30 detects if paper 11 is present and the positions of certain parts of the paper 11.

In addition, by detecting how much the carriage 14 has moved and its position based on the output of the paper width detector 29, the control unit 30 can determine if a carriage 14 transportation error has occurred, and can determine if a paper jam error or a mechanical error has occurred. For example, if no output from the paper width detector 29 is received even though the carriage motor 16 is being driven, it can be determined that the carriage 14 has been locked by a paper jam. Carriage locked states in which the carriage is locked at the home position and prevented from moving by a carriage lock mechanism can also be detected.

Reprinting Control

Figure 5:
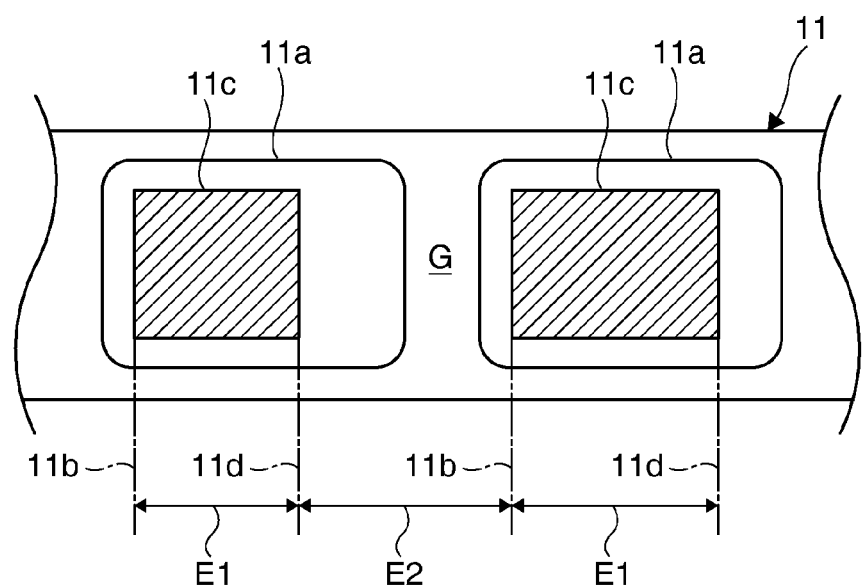
FIG. 5 describes the actual printing area and the non-printing area on the paper.

Reprinting control in a printer 1 according to this embodiment of the invention is described next. FIG. 5 describes the actual printing area of the paper (the printing area) and the non-printing area (print margins). This embodiment describes reprinting control when label paper is used as the paper 11.

Labels 11a are affixed with a constant gap therebetween on the paper 11. The printing start position 11b of each label starts a specific margin distance from the leading edge of each label 11a, and the print image 11c (print content) to be printed on each page (label) based on the print data is printed starting from this printing start position 11b. The actual printing area E1 of the paper 11 is therefore the portion from this printing start position 11b to the trailing end position 11d of the print image 11c, and the non-printing area E2 of the paper 11 includes the margin from the leading edge to the printing start position 11b, the margin from the trailing end position 11d of the print image 11c to the trailing end of of the label, and the label gap G between the labels. More specifically, the non-printing area E2 is the part from the trailing end position 11d of the print image 11c on one label to the printing start position 11b of the next label 11a. Note that if continuous recording paper that is not label paper is used, there is no label gap G and the non-printing margins are the non-printing area E2.

Figure 6:
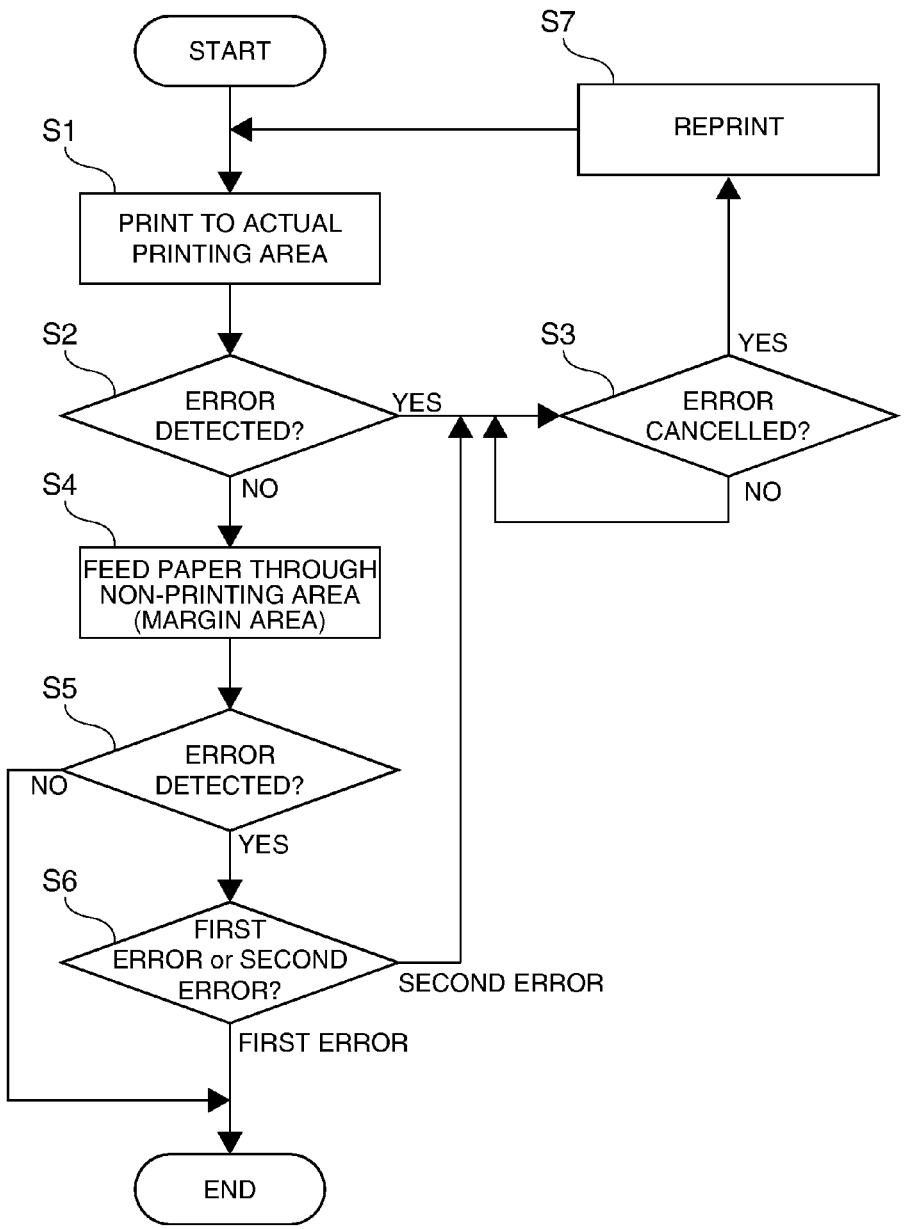
FIG. 6 is a flow chart of the process of determining if reprinting is necessary while executing the label printing process.

The control unit 30 enters a printing standby mode when the printing start position 11b of the paper 11 is indexed to the printing position of the inkjet head 13, and the print data printing process starts from this position. FIG. 6 is a flow chart of the process of determining if reprinting is necessary while executing the label printing process. The process of printing the print data for one page (one label) having an actual printing area E1 and non-printing area E2 disposed sequentially one before the other in the paper transportation direction is described next with reference to the flow chart in FIG. 6.

When the control unit 30 receives print data from the host device 32 and starts the printing process, the paper 11 is conveyed the length of the actual printing area E1 on the paper 11 while driving the inkjet head 13 in conjunction with this transportation operation to form (print) the print image 11c in the actual printing area E1 in step S1. Whether a particular error occurs while printing the print image 11c in the actual printing area E1 is then determined in step S2.

The specific errors of which the occurrence is checked in step S2 may be any selected errors or only errors with a strong possibility of requiring reprinting. Different errors may also be combined.

Errors with a strong possibility of requiring reprinting include errors indicating possible damage to the paper 11, particularly errors with the possibility of damage to the label 11a part and errors with the possibility of damage to the print image 11c printed on the label 11a. More specifically, errors with the possibility of damage to the paper 11 include paper jam errors (a second error) and internal mechanical errors (a second error) caused by a problem with the transportation mechanism or other mechanical unit. Errors with the possibility of damage to the print image 11c include, for example, cover opening errors (a first error) caused by the cover 3 being opened during printing and the shock from opening the cover 3 disrupting carriage 14 transportation and possibly disrupting the print image 11c, and no-paper errors (a first error) resulting from the paper running out during printing and the print image 11c possibly being cut off at the trailing end of the paper 11. Other errors include running out of ink and waste ink overflow errors.

If such an error is confirmed in step S2 (step S2 returns Yes), the control unit 30 stops the printing operation, goes to step S3, and enters a standby mode waiting for the error to be corrected. If an error is not confirmed in step S2 (step S2 returns No), control goes to step S4 and an indexing operation positioning the printing start position 11b of the next label 11a to the printing position of the inkjet head 13 executes. Step S4 thus causes the non-printing area E2 to the actual printing area E1 of the next label 11a to be conveyed passed the printing position of the inkjet head 13.

In step S5 the control unit 30 then determines if a specific error occurred while conveying the paper 11 to move the non-printing area E2 passed the printing position. If such a specific error is not detected in step S5 (step S5 returns No), printing the first label 11a was completed normally, reprinting is not necessary, and the process ends.

However if in step S5 the control unit 30 determines that such a specific error occurred (step S5 returns Yes), whether the error that occurred while the non-printing area E2 was passing the printing position is an error with the possibility of damage to the paper 11, and particularly if it was an error with the possibility of damage to the label 11a part of the paper, is determined. Examples of such errors include paper jam errors (a second error). In addition to paper jam errors, such errors may also include mechanical errors (a second error) such as a problem with the transportation mechanism. Because the period in which step S6 executes is the period when the non-printing area E2 is being conveyed after printing by the inkjet head 13 has ended, errors with the possibility of damage to the print image 11c are not important even if such an error occurs because printing has already ended. Therefore, if a cover opening error (a first error) or a no-paper error (a first error) occurs, processing ends. Alternatively, step S5 may be configured to not detect cover opening errors (a first error) or no-paper errors (a first error).

If the control unit 30 determines in step S6 that such an error occurred (step S6 returns Yes), the control unit 30 stops operation, goes to step S3, enters a standby mode waiting for the error to be corrected, and thereafter continues checking at a regular interval if the error was corrected. If an error is not confirmed in step S6 (step S6 returns No), the control unit 30 determines that the label 11a was printed normally and reprinting is not necessary, and therefore ends the process.

When the error recovery standby mode is entered in step S3 from step S2 or step S6, the control unit 30 checks at a regular interval if the error was corrected. Controls goes from step S2 and step S6 to step S3 only if an error with the possibility that the label 11a was not printed normally occurs. Therefore, when step S3 determines that the error was corrected (step S3 returns Yes), a process to reprint on the next label 11a the print image 11c that was being printed before the error occurred starts (step S7). Control then returns to step S1, the next print data is received, and the printing process repeats.

Effect of at Least One Embodiment of the Invention

As described above, the printer 1 according to this embodiment of the invention separately determines if reprinting is necessary while forming the print image in the actual printing area E1 and again while advancing the non-printing area E2 passed the printing position, and uses different types of errors in the actual printing area E1 and the non-printing area E2 to determine if reprinting is necessary. If an error occurs while printing the print image in the actual printing area E1, the possibility of damage to the print image is high, and the need for reprinting can be determined more accurately by determining the need for reprinting based on whether or not an error occurred while printing the print image to the actual printing area E1.

In addition, by deciding that reprinting is necessary when advancing the paper to render the non-printing area E2 after forming the print image 11c has already been completed only if an error with the possibility of damage to the paper 11 that could also affect the actual printing area E1 and damage the print image 11c occurs, the need for reprinting can be determined even more appropriately. Reprinting when reprinting is not necessary can therefore be reduced, and unnecessary reprinting operations as well as waste of consumables such as paper 11 and ink can be reduced.

Furthermore, because this embodiment of the invention determines if reprinting is necessary based on whether or not an error of a predetermined type has occurred, it is not necessary to have an expensive sensor, such as an image sensor, for confirming if there was any actual damage to the print image 11c or to the paper 11 downstream from the printing position. Printer cost can therefore be reduced and the printer configuration can be simplified.

Yet further, by determining if reprinting is necessary and reprinting label by label while printing the print data, it is possible to print only the required number of correctly printed labels.

In addition, when continuous paper that is not label paper is cut into pages while printing to produce cut sheets, it is possible to print only the required number of correctly printed sheets by determining if an error requiring reprinting occurred while printing a particular page and reprinting that page on the next page of the paper if reprinting is necessary.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A reprinting control method for a printer that prints to a label affixed on a label paper comprising steps of:
    detecting if an error belonging to either at least a first error group or second error group occurs while processing print data;
    determining if the detected error is a first error belonging to the first error group or a second error belonging to the second error group if occurrence of said error is detected; and
    determining whether or not to reprint the print data based on the content of the print data being processed and the result of said error determination when an error is detected to have occurred.

2. The reprinting control method for a printer described in claim 1, further comprising steps of:
    detecting while processing a gap area between the labels on the label paper if the first error or second error occurred when the print data includes a label area and the gap area; and
    reprinting if the second error was detected, and
    not reprinting if the first error was detected.

3. The reprinting control method for a printer described in claim 1, further comprising steps of:
    detecting while processing a margin area of a particular label if the first error or second error occurred when the print data includes a printing area of the particular label;
    reprinting to a next label after the particular label on the label paper if the second error was detected; and
    not reprinting if the first error was detected.

4. The reprinting control method for a printer described in claim 1, further comprising steps of:
    detecting while processing a label area if the first error or second error occurred when the print data includes the label area and a gap area between the labels; and
    reprinting if the first error was detected or if the second error was detected.

5. The reprinting control method for a printer described in claim 1, further comprising steps of:
  detecting while processing a printing area of a particular label if the first error or second error occurred when the print data includes the printing area and a margin area of a particular label; and
  reprinting to a next label after the particular label on the label paper if the second error was detected.

6. The reprinting control method for a printer described in claim 1, wherein:
  the second error group includes at least an error resulting from a label paper jam or an error relating to a mechanical problem.

7. The reprinting control method for a printer described in claim 1, wherein:
  the first error group includes an error resulting from an open cover or an error resulting from no label paper.

8. A printer that prints to a label affixed on a label paper comprising:
  a transportation unit that conveys the label paper;
  a print head that prints to the label;
  a first error detection unit that detects a first error belonging to a first error group;
  a second error detection unit that detects a second error belonging to a second error group; and
  a control unit that processes print data,
  determines if the first error detection unit or second error detection unit detected an error, and
  determines whether or not to reprint the print data based on the content of the print data being processed and the result of said error determination when an error is detected to have occurred.

9. The printer described in claim 8, wherein:
  when the print data includes a label area and a gap area between the labels on the label paper,
  the control unit reprints if the second error detection unit detected the second error while processing the gap area; and
  does not reprint if the first error detection unit detected the first error.

10. The printer described in claim 8, wherein:
  when the print data includes a printing area and a margin area of a particular label,
  the control unit reprints to a next label after the particular label on the label paper if while processing the margin area of the particular label the second error detection unit detected the second error, and
  does not reprint if the first error detection unit detected the first error.

11. The printer described in claim 8, wherein:
  when the print data includes a label area and a gap area between the labels,
  the control unit reprints if the first error detection unit detects the first error or the second error detection unit detects the second error while processing the label area.

12. The printer described in claim 8, wherein:
  when the print data includes a printing area and a margin area of a particular label,
  the control unit reprints to a next label after the particular label on the label paper if the first error detection unit detects the first error or the second error detection unit detects the second error while processing the printing area of the particular label.

13. The printer described in claim 8, wherein:
  the second error group includes at least an error resulting from a label paper jam or an error relating to a mechanical problem.

14. The printer described in claim 8, wherein:
  the first error group includes an error resulting from an open cover or an error resulting from no label paper.

\* \* \* \* \*